United States Patent Office 2,900,527
Patented Aug. 18, 1959

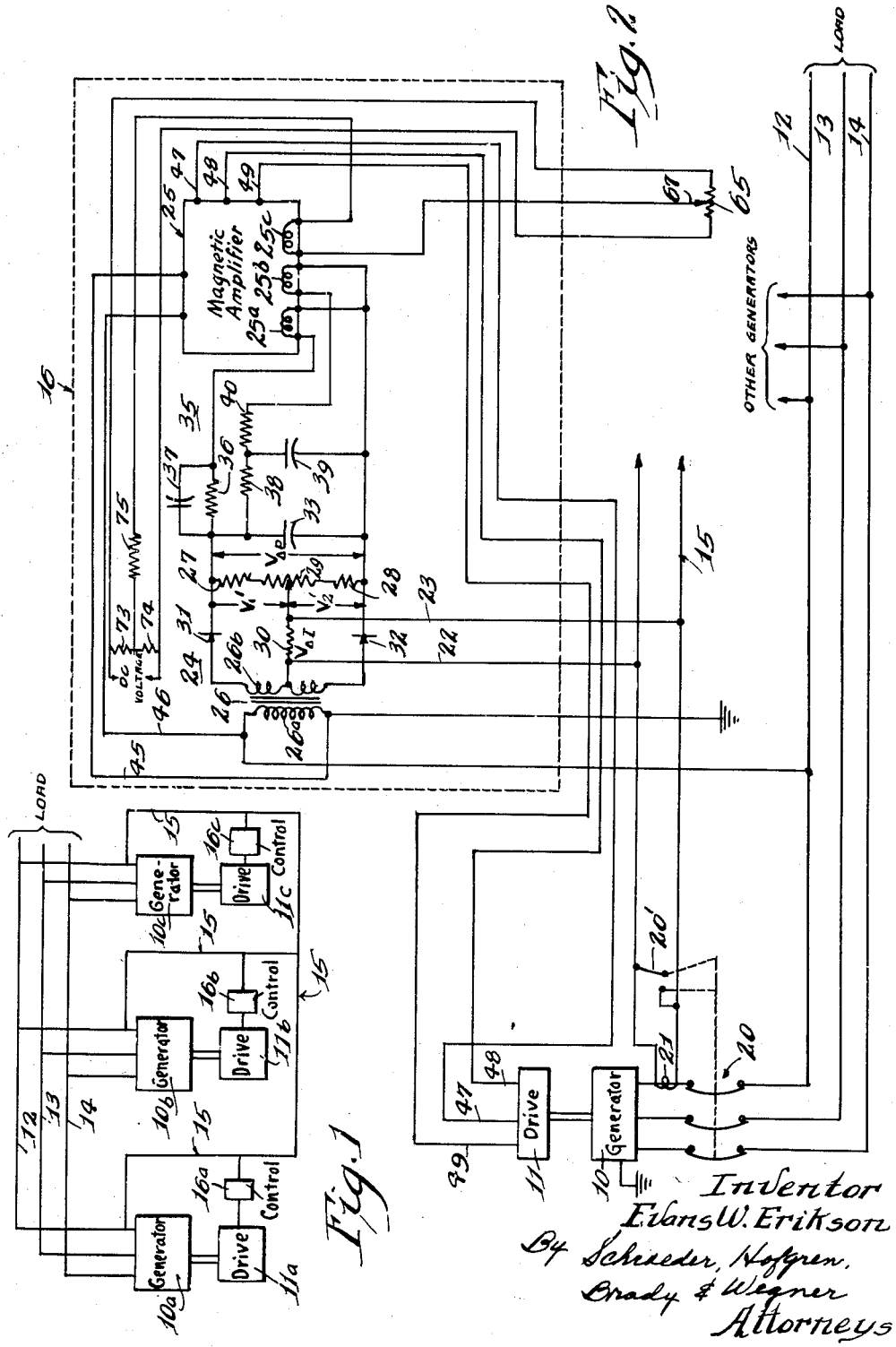

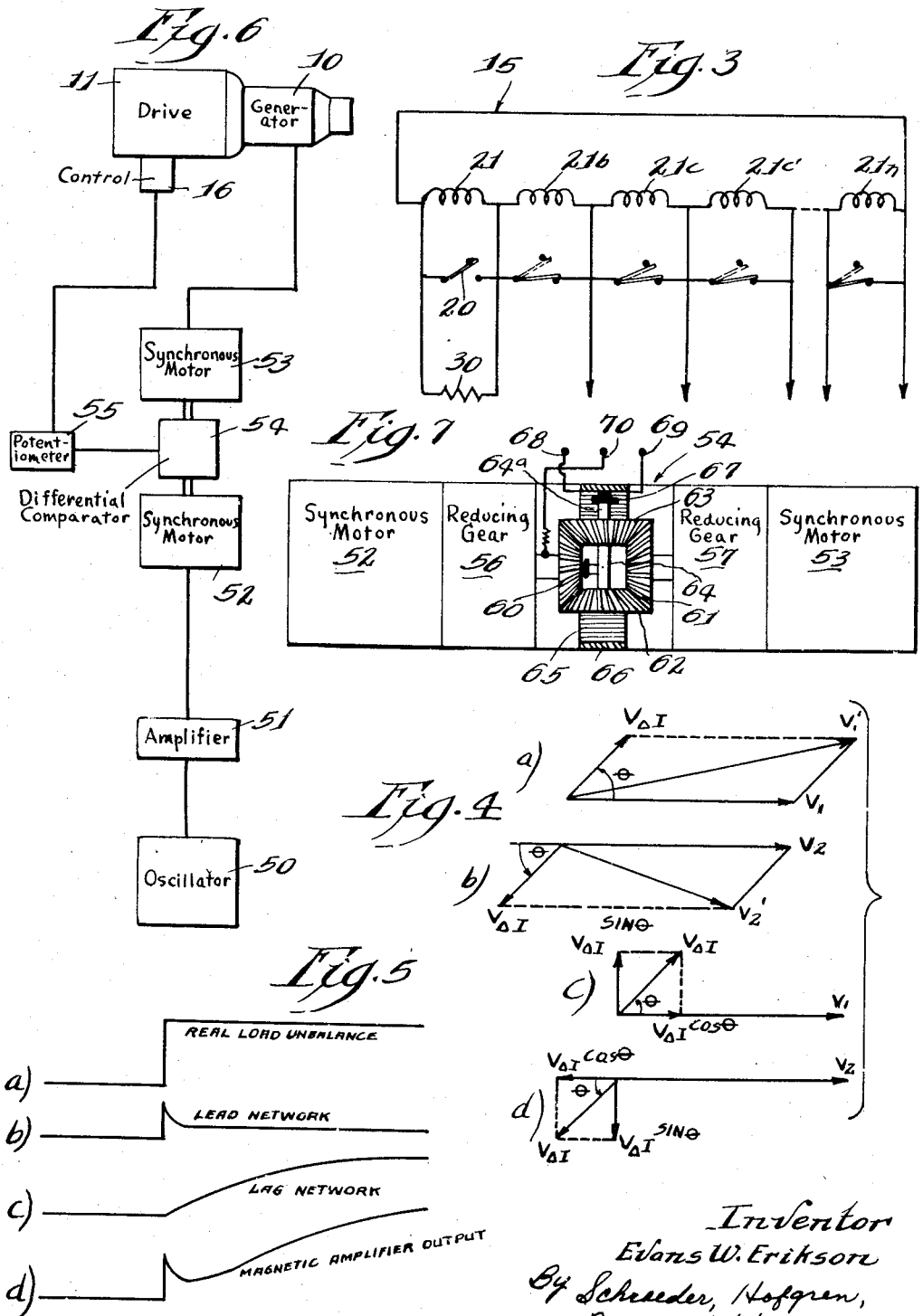

2,900,527

GENERATOR CONTROL SYSTEM

Evans W. Erikson, Rockford, Ill., assignor to Sundstrand Machine Tool Co., a corporation of Illinois Application July 25, 1956, Serial No. 600,091

7 Claims. (Cl. 307—57)

This invention is concerned with a generator control system and more particularly with a frequency and load division control system.

It is a general object of this invention to provide a new and improved generator control system.

Another object of the invention is to provide a generator control system in which the generator drive means incorporates a basic generator speed control and in which minor corrections are made in the drive means to maintain the frequency of the generator constant and to adjust its phase relation so that it carries a predetermined load.

A further object is the provision of a load control system comprising two or more generators, drive means for the generators, sensing means for deriving a signal representing the unbalance between the real load carried by one of the generators and an average of the loads carried by the other generators, and control means responsive to said signal for controlling the drive means to cause the one generator to carry a predetermined load.

Another object is the provision of a sensing circuit for use in such a system and including means providing a signal representing a voltage condition, means providing a signal representing the current condition, a circuit for obtaining the sum of said signals, a circuit for obtaining the difference of said signals, and a circuit for obtaining the difference of said sum and difference signals.

A further object of the invention is the provision in a multiple-generator load division system of control means comprising means providing a signal which is a function of the load unbalance of a generator in the system, signal shaping means for imparting to the signal a desired characteristic, and means responsive to the shaped signal for affecting the relative speed of the generator to balance the load thereof. Another object of the invention is the provision of such a signal shaping means including a peaking circuit for imparting a leading characteristic to the signal and an integrating circuit for imparting a lagging characteristic to the signal.

A further object of the invention is the provision of a frequency control system comprising a generator, means for driving the generator, first governing means associated with the driving means for maintaining the speed of the generator within predetermined limits; and second governing means associated with the drive means for trimming the speed of the generator within very close limits. A further object is the provision in such a system of a frequency standard for producing an electrical signal at the desired generator frequency, a first synchronous motor energized by the signal from the frequency standard, a second synchronous motor energized by the output of the generator, differential gear means for comparing the speeds of the two motors, and potentiometer means actuated by the differential gear means for providing a signal, the polarity and magnitude of which are functions of the time integral of error in the frequency of the generator.

Another object is that the differential gear means of the foregoing paragraph includes a pair of opposed input gears, a pair of idler gears mounted on a shaft and interposed between the input gears, a resistor formed on an annular member surrounding the gears and a wiper arm carried by the idler gear shaft in contact with the resistor to provide a desired signal.

Other and further objects of the invention will be readily apparent from the following description and accompanying drawings, in which:

Figure 1 is a block diagram of a multiple generator system;

Figure 2 is a schematic drawing of an individual generator control unit;

Figure 3 is a schematic drawing of the current loop circuit;

Figure 4 is a series of vector diagrams illustrating the voltage and current relationships in the circuit of Figure 2;

Figure 5 is a series of curves showing several wave forms in the circuit of Figure 2;

Figure 6 is a block diagram of the frequency control system; and

Figure 7 is a view, partially in section and partially in elevation, of the differential frequency comparator.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The generator control system disclosed herein is particularly designed for use in multi-engine aircraft. Modern aircraft are continually being provided with more refined control systems and other devices which are operated electrically. The electrical power for such systems is provided by a generator or generators driven from the engines of the plane through constant speed drive means of the character disclosed in Sadler et al. application, Serial No. 259,872, filed Dec. 4, 1951, and which may utilize a magnetically adjusted governor such as that shown in Straznickas application, Serial No. 541,459, filed October 19, 1955. In the interest of minimizing weight, it is desirable that the loads carried by the various generators be accurately divided in a predetermined relation so that each generator will carry an optimum share of the load and the capacity, and thus the size and weight of the individual generators may be minimized. It is also important that the frequency of the electrical current of each generator be regulated within very close limits.

Turning now to the drawings, in Figure 1 a basic block diagram of the load division system is shown. Three 3-phase generators, 10a, 10b and 10c are shown, each powered by suitable drive means 11a, 11b and 11c, respectively. The output of each generator is connected to the three conductors 12, 13 and 14 of the 3-phase electrical distribution system. The drive means preferably comprise a prime mover such as the engines of the aircraft in an aircraft system, and include a transmission such as shown in the aforementioned patent applications which is capable of being preset to maintain approximately the desired constant speed and has provision for introducing further speed control to govern or "trim" the generator speed with a great degree of accuracy. This further speed control may be utilized to maintain an extremely constant generator frequency and also to adjust the phase relation of the generator, thus controlling the load carried by the generator.

An indication of the load carried by each generator is coupled to a current loop circuit indicated generally as 15 and suitable control systems 16a, 16b and 16c are provided, one for each generator, to determine the load unbalance of each generator, that is the difference between the load carried by each generator and an average of the loads carried by the other generators. A signal corresponding to the real load unbalance is coupled to the drive means of the unbalanced generator or generators to trim the speed thereof slightly and maintain the loads carried by each generator in a predetermined relationship. The frequency control system is not shown in Figure 1 and will be described later.

Turning now to Figure 2, a single generator 10 and its associated control system 16 are shown. The generator 10 is powered by drive means 11 and its output is connected through a generator relay 20 to the electrical distribution system 12, 13 and 14 to which the other generators of the system and the various loads are connected. The current loop 15 includes a current transformer 21 inductively coupled to one phase of the generator 10.

Referring to Figure 3, it will be seen that current loop 15 includes the current transformer 21 associated with generator 10 and transformers 21b, 21c, 21d . . . 21n, each connected with the corresponding phase of the various generators of an n-generator system. Connected in parallel with each of the transformer coils of the current loop is a switch which is mechanically associated with the generator relay and which shunts the current transformer coil when the generator relay is open and the generator is not in use. The current transformers are connected in a closed series loop. As is known, the voltage appearing across each current transformer coil represents the vector difference between the current in that coil and the vector average of the currents in all of the other coils. Thus, this signal is a function of the complex current unbalance of the generator with which the transformer is associated.

Returning now to Figure 2, the signal representing the vector current unbalance of the generator 10 is connected through leads 22 and 23 to a power unbalance sensing circuit designated generally as 24. The output signal of circuit 24 is connected to magnetic amplifier 25, the output of which is in turn coupled to generator drive 11 in such a manner that an unbalance in the load carried by generator 10 is automatically eliminated.

Power unbalance sensing circuit 24 includes a transformer 26 having a primary winding 26a which is connected between the generator phase from which the current indication is obtained and ground. The secondary winding 26b of the transformer is center tapped and has connected across it a resistance load made up of resistors 27 and 28 and the potentiometer 29. Capacitor 33 filters the ripple voltages from the signal appearing across the load resistors. The movable tap of potentiometer 29 is connected through resistor 30 to the center tap of transformer secondary winding 26b, forming two loop circuits. Interposed in each loop is a rectifier, as 31 and 32, preferably a dry rectifier of suitable characteristics. The vector unbalance current signal for generator 10 which appears between conductors 22 and 23 is impressed across resistor 30.

The operation of the real load unbalance sensing circuit 24 will be considered with reference to Figure 4. Figure 4a shows that the voltage $V_1'$, appearing across resistor 27 and the upper portion of potentiometer 29 is the vector sum of $V_1$, the voltage across the upper half of transformer secondary winding 26b, and $V_{\Delta I}$, the current unbalance signal appearing across resistor 30. This voltage of course is present only during the portion of the cycle in which rectifier 31 conducts in the forward direction. Figure 4b represents the voltage conditions in the lower loop during the forward conduction period of rectifier 32 and shows that voltage $V_2'$, across resistor 28 and the lower portion of resistor 29 is the vector sum of $V^v{}_I$ and $V_2$, the voltage across the lower half of secondary transformer winding 26b.

The voltage $V_{\Delta P}$ across resistors 27, 29 and 28 is equal to the difference in magnitude of the voltages $V_1'$ and $V_2'$. The significance of this voltage is best illustrated by redrawing Figures 4a and 4b with $V_{\Delta I}$ resolved into its real and reactive components as has been done in Figures 4c and 4b. Considering first the real components only, and subtracting the voltages of Figure 4d from Figure 4c:

$$V_1 - V_2 + V_{\Delta I} \cos \theta + V_{\Delta I} \cos \theta = 2V_{\Delta I} \cos \theta$$

Considering just the reactive components of the load, the same subtraction gives:

$$\left[V_1^2 + (V_{\Delta I} \sin \theta)^2\right]^{\frac{1}{2}} - \left[V_2^2 + (-V_{\Delta I} \sin \theta)^2\right]^{\frac{1}{2}} = 0$$

Thus it is seen that the signal $V_{\Delta P}$ is a function of $V^v{}_I \cos \theta$. Inasmuch as the voltage throughout the system is maintained constant this signal is also a function of the real load unbalance of generator 10 or, in other words the difference between the real load carried by the generator 10 and an average of the real loads carried by the other generators in the system.

The load unbalance signal $V_{\Delta P}$ is coupled through shaping circuit means indicated generally as 35 to the magnetic amplifier 25. The shaping circuits are particularly designed to provide a desired degree of compensation to the load unbalance signal $V_{\Delta P}$ so that the system responds rapidly to correct an unbalance, yet is stable and does not hunt about the desired end point. In the preferred embodiment illustrated, the shaping circuit includes a lead or peaking circuit made up of resistor 36 and capacitor 37 connected in parallel, the parallel combination being connected in series relation between the power unbalance sensing circuit 24 and a signal input winding 25a of the magnetic amplifier. A second shaping circuit, which provides a lag characteristic to the signal, comprises an integrating circuit made up of series resistor 38, shunt capacitor 39 and series resistor 40, connect between the load unbalance sensing circuit 24 and a second input winding 25b of the magnetic amplifier. Referring now to Figure 5 of the drawings, the operation of the wave shaping circuits is shown in connection with a signal, Figure 5a, representing a step of real load unbalance, which might occur, for example, if an additional load were suddenly added to the system. The first wave shaping circuit provides a lead characteristic to the signal, peaking the leading wave front thereof as shown in Figure 5b, and this signal is applied to amplifier input 25a. The lag network integrates the unbalance signal and the resulting wave applied to winding 25b has the shape shown in Figure 5c. Figure 5d shows a composite wave form representing the output of the magnetic amplifier. This signal has a peaked leading edge resulting from the action of the lead network causing the system to respond rapidly to the step of real load unbalance. The signal then drops off following generally the response of the lead network until the signal from the lag or integrating network rises providing a control signal which gradually brings the system to the desired end point.

The magnetic amplifier receives power excitation through conductors 45 and 46 connected between one phase of the output of generator 10 and ground. The output of the magnetic amplifier is coupled through conductors 47, 48 and 49 to the generator drive means 11 to effect the desired changes therein. A third signal input winding 25c receives a frequency correction signal, as will appear, so that the same magnetic amplifier is utilized to effect control of both the load division and frequency of the generator.

As mentioned briefly above, the drive means 11 includes a mechanism for maintaining the speed of the generator constant within certain limits, as within ± one percent, and in addition is responsive to correction signals from the magnetic amplifier to effect slight variations in the generator speed, either to change the phase relation of the generator slightly, and thus the load carried by the generator, or to keep the frequency constant.

Considering now the preferred embodiment of the generator frequency control shown in Figure 6, a frequency standard such as tuning fork oscillator 50 is provided. The tuning fork oscillator preferably has a frequency equal to the desired generator frequency, 400 cycles per second for most aircraft systems, has an accuracy of the order of plus or minus 0.02 cycles per second. The output of the tuning fork oscillator is coupled to a power amplifier 51, the output of which energizes a synchronous motor 52. A similar synchronous motor 53 is energized from generator 10. The speeds of the two generators are compared by a differential comparator 54 and any difference in the speeds of the two synchronous motors, which may be due to a drift in the generator frequency, results in an output from the differential comparator 54. This output indication is utilized to produce a signal, as from potentiometer 55, which is coupled to the control system 16 to adjust the drive means 11 in a manner as to correct the frequency of the generator.

Referring now to Figure 7, the two synchronous motors 52 and 53 are shown in block form. Suitable speed reducing gear means 56, 57 are driven by the shafts of the synchronous motors and in turn drive the opposed input gears 60 and 61 of a differential gear train. The idler gears 62 and 63 of the differential are mounted on shaft 64 and, so long as the speed of the two synchronous motors are the same, the shaft 64 is stationary. However, if the speed of the generator should vary, there will be a resulting change in the position of shaft 64 which may be utilized to provide a correction signal to the generator control system. As shown in Figure 7, a resistor 65 is wound on an annular form 66 surrounding the differential gears. An extension 64a of shaft 64 carries a wiper element 67 which contacts the resistor 65. Suitable terminals 68 and 69 are provided for the resistor 65 and connection may be made to the wiper 67 through terminal 70, the differential gears and shaft 64.

Referring once again to Figure 2, it will be seen that the resistor 65 makes up two arms of a bridge circuit, the other two arms of the bridge comprising resistors 73 and 74. The center arm of the bridge is made up of fixed, series resistor 75 and signal input winding 25c of the magnetic amplifier which is in turn connected to wiper 67. The suitable D.C. voltage is applied across the bridge as indicated. From a consideration of this circuit it readily appears that if the wiper 67 is at the mid-point of resistor 65 (assuming that resistors 73 and 74 are equal) no signal is applied to the magnetic amplifier. This is the situation when the basic governor is controlling the generator frequency to precisely the frequency of the tuning fork oscillator. If the frequency of the generator should drift, however, the differential comparator moves the wiper arm in one direction or another depending on whether the generator frequency increases or decreases and a current will flow in the center arm of the bridge, through control winding 25c of the magnetic amplifier. The amplitude of this control signal will of course depend on the time integral of the difference between the generator frequency and the tuning fork frequency. The control signal to the magnetic amplifier is of such a polarity as to cause a change in the setting of drive means 11 to return the generator to the desired frequency. Inasmuch as the tuning fork speed control is used solely to trim the speed of the governor and basic reliance is placed on the speed control in the drive means, the elements which make up the tuning fork frequency control need not be manufactured to very precise limits.

I claim:

1. A generator load control system of the character described, comprising: at least two generators; drive means for said generators; first governing means associated with said driving means for maintaining the speed of said generators within predetermined limits; sensing means for deriving a signal representing the unbalance between the current of one of said generators and an average of the currents of the other generators; a balanced sensing circuit, including rectifier means, for combining said signal with a signal representing the voltage of said generator to provide a signal which is a function of the real power unbalance between the load carried by said one generator and an average of the loads carried by said other generators; circuit means connected to said sensing circuit for deriving from said signal a first control signal having both a leading and a lagging characteristic; a frequency standard for producing an electrical signal at the desired generator frequency; a first synchronous motor energized by the signal from said frequency standard; a second synchronous motor energized by the output of said generator; differential gear means having two inputs, one connected with each synchronous motor and an output; potentiometer means actuated by the output of said differential gear means to provide a second control signal, the polarity and magnitude of which are functions of the time integral of error in the frequency of said generator; a magnetic amplifier having a plurality of inputs; means connecting said first control signal to one of said inputs; means for connecting said second control signal to another of said inputs; and means connecting said magnetic amplifier output to said drive means for trimming the speed of the drive means within very close limits to control both the frequency of said generator and the load carried thereby.

2. A generator load and frequency control system of the character described, comprising: at least two generators; drive means for each of said generators; first governing means associated with said drive means for maintaining the speed of said generators within predetermined limits; sensing means for deriving a first signal representing the unbalance between the real load carried by one of said generators and an average of the loads carried by the other generators; a frequency standard; means for comparing the output frequency of said one generator with said frequency standard and for deriving a second signal representing the difference therebetween; a magnetic amplifier having a plurality of signal inputs and an output; means connecting said first signal to one of said inputs; means connecting said second signal to another of said inputs; and means connecting the output of said magnetic amplifier to said drive means for trimming the speed of the drive means within very close limits to control both the frequency of said generator and the load carried thereby.

3. A generator load and frequency control system of the character described, comprising: at least two generators; drive means for each of said generators; first governing means associated with said drive means for maintaining the speed of said generators within predetermined limits; sensing means for deriving a signal representing the unbalance between the real load carried by one of said generators and an average of the loads carried by the other generators; a frequency standard; means for comparing the output frequency of said one generator with said frequency standard and for deriving a signal representing the difference therebetween; and control means responsive to both of said signals for controlling the drive means associated with said one generator for trimming the speed of said drive means within very close limits, to control both the frequency of and load carried by said one generator.

4. A generator load control system of the character described, comprising: at least two generators; drive means for said generators; sensing means for deriving a signal representing the unbalance between the current of one of said generators and the average of the currents of the other generators; a balanced sensing circuit including a transformer having a primary winding to which is connected the output voltage of said one generator, a center tapped secondary winding having a resistor connected in series with said center tap and across which the current unbalance signal is impressed, an output resistor connected across said secondary and to said series resistor, and rectifier means connected between said transformer secondary winding and said output resistor, for combining the current unbalance signal with the voltage signal of said one generator to provide a control signal which is a function of the real power unbalance between the load carried by said one generator and an average of the loads carried by the other generators; and control means responsive to said control signal for controlling the drive means associated with said one generator to cause said one generator to carry a load which bears a predetermined relation to the average of the loads carried by said other generators.

5. A generator load control system of the character described, comprising: at least two generators; drive means for said generators; means for providing a signal which is a function of the difference between the current of one generator and an average of the currents of the other generators; sensing means for combining said difference signal with a signal representing the voltage of said generator to provide a control signal which is a function of the power unbalance between the power supplied by said one generator and an average of the power supplied by the other generators; and means responsive to said control signal for controlling the drive means associated with said one generator to cause said one generator to carry a load which bears a predetermined relation to an average of the loads carried by said other generators.

6. In a method of operating a plurality of alternators in parallel, the step of increasing or decreasing prime mover torque in accordance with the integral sum of the difference between loading of the particular alternator and average loading of all the alternators, and the difference between alternator output frequency and a predetermined reference frequency, thereby to maintain equalization of real power and regulation of frequency of the alternators.

7. In a method of operating a plurality of power sources in parallel to drive a common load connected thereto, hence constrained to operate at the same speed, the step of increasing or decreasing force exerted on said power sources respectively in accordance with the integral sum of the difference between loading of the particular power source and average loading of all the power sources, and the difference between power source speed and a predetermined reference speed, thereby to maintain equalization of power delivery to the load by the different power sources and regulation of speed of the power sources.

References Cited in the file of this patent

UNITED STATES PATENTS

| | | |
|---|---|---|
| 420,924 | Waterhouse | Feb. 4, 1890 |
| 1,714,656 | Burgess et al. | May 28, 1929 |
| 2,475,050 | Purington | July 5, 1949 |
| 2,566,694 | Chillson | Sept. 4, 1951 |
| 2,611,847 | Scott | Sept. 23, 1952 |
| 2,616,013 | Greenlee | Oct. 28, 1952 |
| 2,636,132 | Stineman et al. | Apr. 21, 1953 |
| 2,703,862 | Gordon | Mar. 8, 1955 |
| 2,722,654 | Sikorra | Nov. 1, 1955 |
| 2,749,450 | Wellington | June 6, 1956 |
| 2,767,367 | Black | Oct. 16, 1956 |
| 2,802,952 | Fairweather | Aug. 13, 1957 |